UNITED STATES PATENT OFFICE.

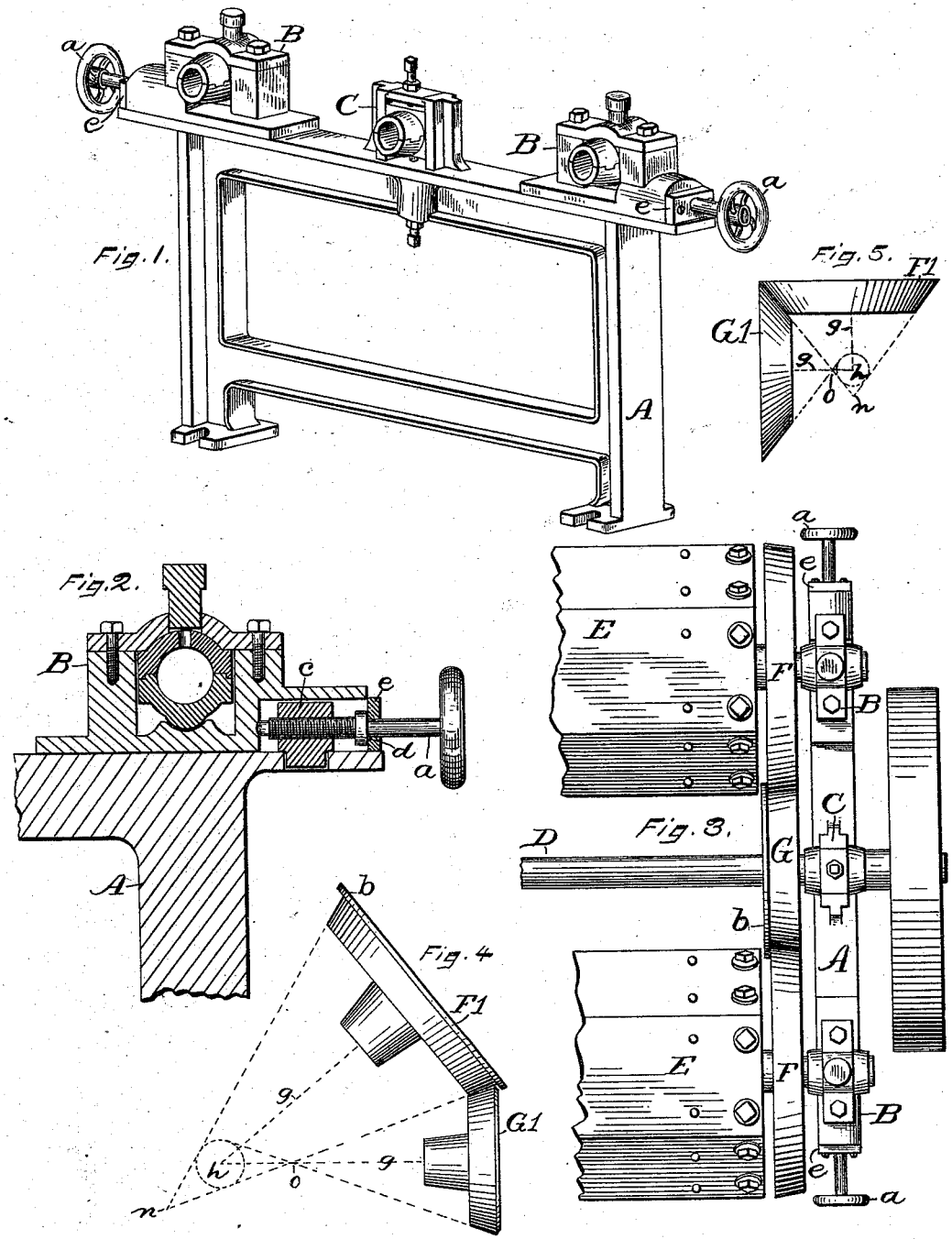

JOHN HENDERSON, JR., OF WATERBURY, CONNECTICUT.

FRICTION-GEARING.

SPECIFICATION forming part of Letters Patent No. 412,386, dated October 8, 1889.

Application filed April 25, 1887. Serial No. 235,978. (No model.)

*To all whom it may concern:*

Be it known that I, JOHN HENDERSON, JR., a citizen of the United States, residing at Waterbury, in the county of New Haven and State of Connecticut, have invented certain new and useful Improvements in Friction-Gearing, of which the following is a specification.

My invention relates to improvements in friction-gearing; and the objects of my improvement are to simplify the construction and to increase the efficiency and durability of the gearing.

In the accompanying drawings, Figure 1 is a perspective view of the frame and bearing for one end of the shafts upon which my gearing is mounted, said frame being specially adapted for use in connection with tumbling-barrels. Fig. 2 is a vertical section of a portion of said frame and one of its adjustable pillow-blocks. Fig. 3 is a plan view of said frame together with my gearing and the ends of two tumbling-barrels; and Figs. 4 and 5 are elevations of my gearing, together with diagrams showing the relation of their operative faces to the axes of the wheels.

My friction-gearing is specially adapted for driving tumbling-barrels; but it is also applicable to driving various machinery.

Friction-gearing—that is to say, wheels which act upon each other by the adhesion of their contacting-surfaces—have heretofore been made in many forms; but so far as I am aware all driving-gearing of this class has either been made with a single-tread face on each wheel, with said treads parallel to their axes, or with several treads in the form of opposing V-shaped grooves and ridges. I provide only a single tread for each wheel, with the treads so related to the axes of the wheels as to necessitate a slipping motion between the treads, thereby increasing the friction between the driving and driven wheel.

I also arrange the bearings in such manner as in a measure to throw the weight of the driven wheel upon the driver.

A designates a frame adapted for mounting tumbling-barrels, or, rather, one end of a pair of barrels which may be provided with a similar frame at their opposite end.

B designates the adjustable pillow-blocks provided with the shipping-screw a, and C designates the pillow-block for supporting the driving-shaft D, Fig. 3. The pillow-blocks B contain bearings for the shafts or trunnions of the barrels E, upon which trunnions or shafts I also mount the driven wheels F, whose treads bear upon the tread of the driving-wheel G on the shaft D. I have represented this driving-wheel G as provided with a thin flange b for better holding the beveled treads in working contact and to relieve somewhat the endwise pressure of the barrels. The treads of the wheels F F G, which constitute the friction-gearing, are each single treads, with their faces slightly beveled, as shown, so that there is necessarily somewhat of a slipping action at their point of contact of portions of the treads, this resulting, of course, from the difference of diameters of the respective wheels and consequent different rates of speed of the contacting surfaces. The face of the flange b which bears against the side of the wheel that works against the wheel bearing said flange stands at substantially a right angle to the axis of said flanged wheel, and thereby differs from the broad beveled treads.

The pillow-blocks B may be made adjustable to and from the pillow-block C by any suitable means, so that said blocks serve as the shipper for bringing the driven wheel F into and out of contact with the driver-wheel G for starting and stopping the barrel. For this purpose they are arranged to slide loosely upon the frame A, and they are moved or shipped by means of the shipping-screw a, the nut c of which is secured to the frame A by dropping its lower end into a mortise, as shown in Fig. 2. The inner end of the screw bears against a solid part of the pillow-block, while the collar or shoulder d on the screw bears against the inside of the cap e, which is fast to the end of the pillow-block, and covers the nut-box, so that while the nut is prevented from moving on the frame A the turning of the screw a will necessarily move the pillow-block B, the point of the screw pushing it forward and the collar pushing it backward as the screw is turned to the right or left. The pillow-block should be left free to rise and fall slightly, so that the faces of the gearing will be pressed firmly together, and a portion of the weight of the barrel be transferred from the adjusting nut and screw to the driving-wheel. In case the treads of the friction-gearing are any of them a little out of true—that is, slightly eccentric—the adaptability of the pillow-blocks to rock a little is very important.

The rule for making the treads when the shafts are parallel is very simple—that is, the faces of the treads should be slightly out of parallelism to the respective axes.

Figs. 4 and 5 show diagrams for laying out the tread-faces of gearing for shafts which stand at an angle to each other, so that said treads will have the same slipping action as the gearing shown in Fig. 3. In said figures F' designates the driven wheel, and G' the driving-wheel. These of course may be varied in size or reversed in their action according to the speed desired.

The broken lines $g$ represent the axial lines of the two wheels, which lines meet in the center of the circle $h$.

Ordinarily beveled wheels would have their faces on lines which would meet in the same center or point as the axial lines of the wheel, but when so made there would be no necessary slipping action of the treads, the action of the treads being then precisely the same as if the treads of parallel shafts were arranged parallel to their axes. I make the treads on such an angle that lines extended from opposite sides of the tread in a continuation of their angle will meet at points on opposite sides of the center of the circle $h$, as shown at the points $n$ $o$. Thus it will be seen that in Figs. 3, 4, and 5 the faces of the treads are slightly out of parallel to a line running through the meeting point of the driver and driven wheel at the same proportionate distance from the axis of each wheel. Friction-gearing made on this plan has been put into practical use for driving tumbling-barrels and has been found to be very efficient.

I claim as my invention—

1. The combination of the driving-shaft D, the driving-wheel G, the driven wheel F, and its shaft arranged parallel to said driving-shaft, the wheels G and F having single treads each parallel to each other and out of parallelism to said parallel shafts, substantially as described, and for the purpose specified.

2. The herein-described friction-gearing for communicating power, consisting of the driving-shaft, the driving-wheel mounted thereon, the driven wheel on a carrying-shaft, each wheel having a single tread, one wheel being provided with a holding-flange, the treads of the two wheels being parallel to each other and out of parallel to a line running through their meeting point at the same proportionate distance from the axis of each wheel, substantially as described, and for the purpose specified.

3. The combination of a frame, the beveled friction-gearing mounted thereon, the pillow-block B, having a bearing for the driven wheel of said friction-gear, the nut $c$, and the shipping-screw $a$, substantially as described, and for the purpose specified.

4. The combination of a frame, the friction driving-gearing mounted thereon, the pillow-block B, having a bearing for the driving-wheel and carrying one end of the barrel-shaft, said block being adapted to rise and fall on the frame, and shipping mechanism that bears upon the pillow-block at a point below the axis of the barrel-shaft, whereby the weight of the barrel may be thrown on said friction-gearing, substantially as described, and for the purpose specified.

JOHN HENDERSON, JUNR.

Witnesses:
A. M. BLAKESLEY,
GEO. E. JUDD.